Jan. 10, 1950  F. J. HODER, JR  2,494,175
ADAPTER FOR VEHICLE-MOUNTED MACHINES
Filed March 15, 1946
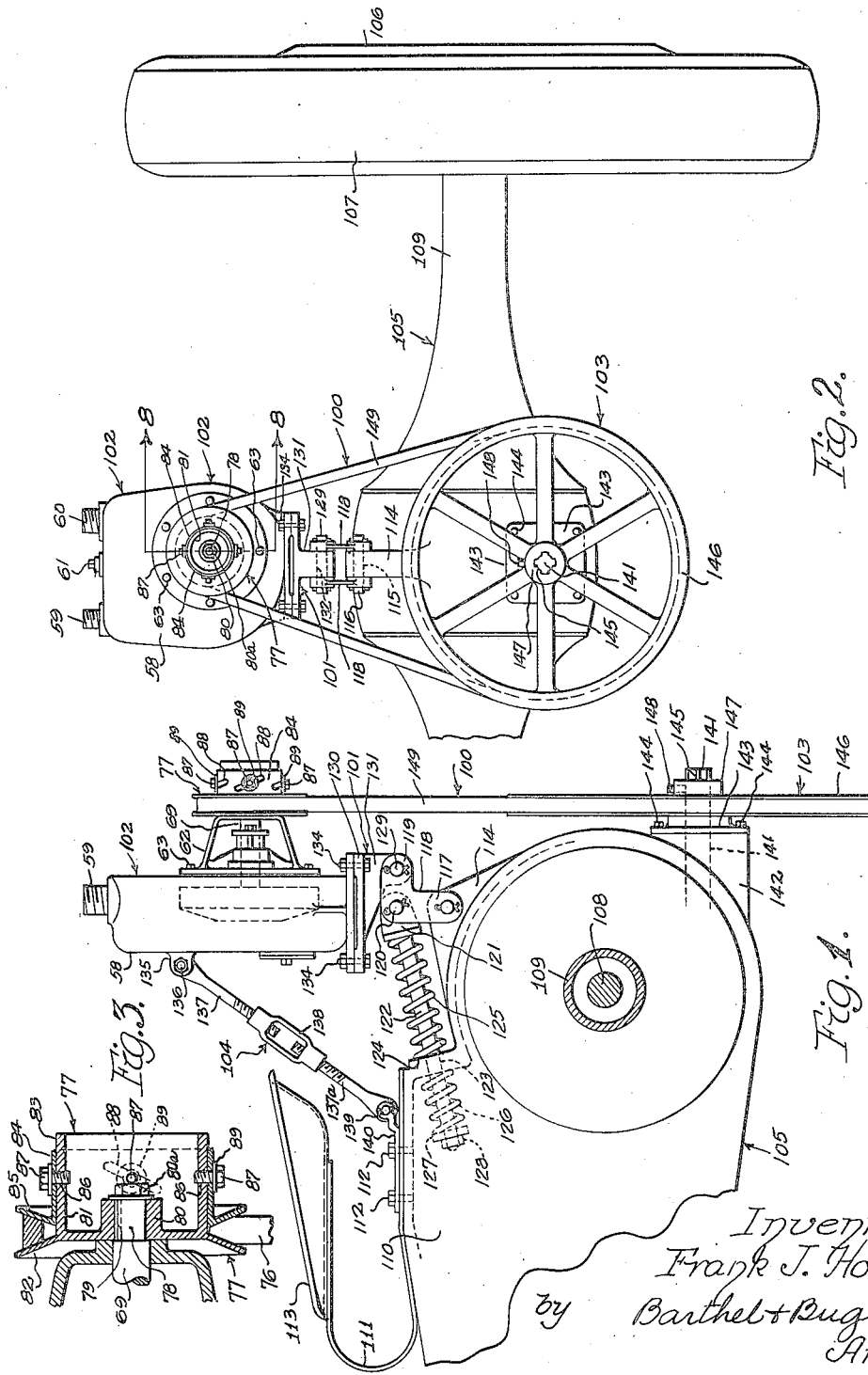
Inventor
Frank J. Hoder Jr.
by Barthel & Bugbee
Atty's Patented Jan. 10, 1950

2,494,175

UNITED STATES PATENT OFFICE 2,494,175

ADAPTER FOR VEHICLE-MOUNTED MACHINES

Frank J. Hoder, Jr., Detroit, Mich., assignor to Marine Products Company, Detroit, Mich., a corporation of Michigan Application March 15, 1946, Serial No. 654,774

4 Claims. (Cl. 180—53)

This invention relates to supports, and in particular to adaptation supports for vehicle-mounted machines, such as pumps, compressors and other machines driven from a power take-off on the vehicle.

One object of this invention is to provide an attachment device for mounting machines driven from a power take-off on the vehicle wherein the device is quickly attached to and detached from the vehicle so that it is mounted on the vehicle only when necessity for its use arises and at other times it is stored away from the vehicle.

Another object is to provide an attachment device for machines mounted on vehicles and driven from a power take-off thereon wherein the device includes a support mounted on the draw bar mechanism of the vehicle, such as a tractor, and is simply and quickly removable therefrom.

Another object is to provide an attachment device as set forth in the preceding objects wherein a simple adjustment is provided for taking up slack in the belt by which the machine is driven from the power take-off.

Other objects and advantages of the invention will become apparent during the course of the following description of the accompanying drawings, wherein:

Figure 1 is a side elevation of an attachment device, according to one form of this invention as applied to the draw bar mechanism of a conventional farm tractor;

Figure 2 is a rear elevation of a portion of the tractor and attachment device shown in Figure 6; and Figure 3 is a vertical section through the belt-tightening mechanism forming a part of the attachment device of this invention.

Referring to the drawings in detail, Figures 1 and 2 show the rearward portion of a conventional type of tractor, generally designated 105, well-known in farming and industry upon which is to be temporarily and removably mounted a machine, generally designated 102, which is to be driven from the power take-off shaft of the tractor, as described below.

The machine 102 to be driven from the power take-off output shaft of the tractor 105 may be pump, compressor or other desired type of machine, depending upon the use to which it is to be put. For purposes of illustration, the machine 102 is shown as a pump having a casing 58 with inlet and outlet connections 59 and 60 and an access plug 61 threaded into an opening therein. The machine 102 is provided with a shaft outrigger bracket 62 bolted as at 63 to the casing 58 and serving to rotatably support the machine shaft 69, the opposite end of which is journaled in the housing 58.

In order to drive the machine 102, an adjustable driven pulley, generally designated 77, is mounted upon the machine shaft 69. For this purpose (Figure 3), the machine shaft 69 is provided with a reduced diameter portion 78 having a keyway 79 to which is keyed the hub 80 of a hollow cylindrical member 81 having a fixed pulley side wall 82 integral therewith. The hub 80 is additionally held in position by a nut or cap screw 80a threaded upon or into the outer end of the reduced diameter shaft portion 78. Slidably and rotatably mounted upon the outer surface 83 of the cylindrical member 81 is a sleeve portion 84 having an adjustable pulley wall 85 integral therewith at the end thereof facing the pulley wall 82. The cylindrical member 81 is provided with peripherally spaced threaded holes 86 into which are threaded cap screws 87, the shanks of which pass through spiral or inclined slots 88, washers 89 being provided between the heads of the cap screws 87 and the sleeve member 84.

In order to temporarily and removably support the machine 102 upon the tractor 105, according to one form of the invention, Figures 1 and 2 show an attachment device, generally designated 100 consisting of an attachment support, generally designated 101 upon which is mounted the machine, generally designated 102 operated by driving mechanism, generally designated 103 and equipped with adjustable bracing means, generally designated 104. The attachment device 100 is mounted upon a farm tractor, generally designated 105, the rearward portion of which includes wheels 106 and tires 107 rotatably mounted upon an axle 108 within a rear axle housing 109 and driven from the engine and transmission mechanism (not shown) of the tractor 105. The rear axle housing 109 is provided with an extension 110 (Figure 1) upon the upper portion thereof and having a seat bracket 111 bolted thereto as at 112 and carrying an operator's seat 113. The rear axle housing 109 is also provided with an upwardly extending integral support 114 having a bore 115 therethrough pivotally supporting a pivot pin 116 which in turn pivotally supports the lower arms 117 of bell cranks 118, the upper arms 119 of which are bored at their intersections to receive a pivot pin 120. Connected to the pivot pin 120 is a yoke 121 mounted upon the end of a plunger shaft 122, the intermediate portion of which passes through a bore 123 in a wall 124 of the housing extension 110 and on opposite sides of this wall is provided with compression coil springs 125 and 126 respectively. The coil spring 125 abuts at its forward end against the yoke 121 and at its rearward end against the wall 124, whereas the coil spring 126 abuts at its forward end against the wall 124 and at its rearward end against a washer 127 held in position by a nut 128 threaded upon the rearward end of the plunger shaft 122. The forward ends of the upper arms 119 of the bell crank are bored to receive a pivot pin 129 which in the normal use of the tractor 105 serves to support the draw bar or other towing or pulling device (not shown) employed with the tractor. This is removed in order to mount the attachment device 100 and in its place is mounted the attachment support 101. The latter consists of a platform 130 supported upon an integral depending arm 131 forming a pivot support and bored as at 132 to receive the pivot pin 129. Bolted as at 134 to the platform 130 is the machine 102. The machine 102 is also driven by the adjustable pulley 77 previously described.

The rear wall of the housing 58 of the machine 102 is provided with a projecting ear 135 carrying a pivot bolt 136 to which is connected the upper threaded member 137 of the bracing means 104 which is in the form of a turnbuckle having a threaded adjusting member 138 threaded upon the adjacent ends of the upper threaded member 137 and lower threaded member 137a. The lower end of the latter is pivotally mounted upon a pivot pin 139 carried by the bracket 140 secured by the same bolts 112 which secure the seat bracket 111 to the rear axle housing extension 110.

The tractor 105 is provided with a power take-off shaft 141 mounted in a lower rear axle housing extension 142 and journaled in the closure plate 143 bolted thereto as at 144 (Figure 1). The outer end of the power take-off shaft 141 is splined as at 145 for the reception of gears, pulleys or the like for driving external machinery. The driving mechanism 103 includes a drive pulley 146 having an internally splined hub 147 mounted upon the spline 145 of the power take-off shaft 141 and secured thereto by the set screw 148. The drive pulley 146 and the adjustable pulley 77 are drivingly interconnected by an endless belt 149 threaded around their respective peripheries.

In the installation of the attachment device 100 shown in Figures 1 and 2, the platform 130 is mounted upon the pivot pin 129 in the manner previously described, and the machine 102 secured thereto by the bolts 134. The bracket 140 is permanently attached by removing the bolts 112 and reinserting them after placing the bracket 140 beneath them (Figure 1). The pulley 146 is mounted upon the power take-off shaft 141 and secured in position by the set screw 148. With the machine 102 tilted forward, the endless belt 149 is mounted upon the grooved periphery of the pulleys 146 and 147, whereupon the machine 102 is swung to an upright position around the pivot pin 129. The bracing means or turnbuckle 104 which has been previously connected at its upper end to the pivot bolt 136 is now secured at its lower end to the pivot pin 139 whereupon the adjustment member 138 is tightened in order to bring the machine shaft 69 and power take-off shaft 141 into parallelism, the adjustable pulley 77 being adjusted in the manner previously described to impart the proper tightness to the belt 149.

In this form of the invention, the machine 102 may be removed from the vehicle by reversing the operations described above in connection with the installation and operation thereof in an obvious manner.

While I have shown and described my invention in detail, it is to be understood that the same is to be limited only by the appended claims, for many changes may be made without departing from the spirit and scope of my invention.

What I claim is:

1. An attachment for temporarily and removably mounting a driven machine upon a vehicle equipped with a power take-off unit and a yieldably mounted draw bar connection, comprising a platform having a pivot support projecting therefrom, a pivot member pivotally connecting said pivot support to said draw bar connection, a fastener securing said machine to said platform, a driving pulley removably connectable to said power take-off unit, a driven pulley connected to said machine, and an endless flexible driving member drivingly interconnecting said pulleys.

2. An attachment for temporarily and removably mounting a driven machine upon a vehicle equipped with a power take-off unit and a yieldably mounted draw bar connection, comprising a platform having a pivot support projecting therefrom, a pivot member pivotally connecting said pivot support to said draw bar connection, a fastener securing said machine to said platform, a driving pulley removably connectable to said power take-off unit, a driven pulley connected to said machine, an endless flexible driving member drivingly interconnecting said pulleys, and an adjustable brace extending from said machine to said vehicle remote from said platform.

3. An attachment for temporarily and removably mounting a driven machine upon a vehicle equipped with a power take-off unit and a yieldably mounted draw bar connection, comprising a platform having a pivot support projecting therefrom, a pivot member pivotally connecting said pivot support to said draw bar connection near one edge of said platform, a fastener securing said machine to said platform, a driving pulley removably connectable to said power take-off unit, a driven pulley connected to said machine, and an endless flexible driving member drivingly interconnecting said pulleys.

4. An attachment for temporarily and removably mounting a driven machine upon a vehicle equipped with a power take-off unit and a yieldably mounted draw bar connection, comprising a platform having a pivot support projecting therefrom, a pivot member pivotally connecting said pivot support to said draw bar connection, a fastener securing said machine to said platform, a driving pulley removably connectable to said power take-off unit, a driven pulley connected to said machine, an endless flexible belt drivingly interconnecting said pulleys, and one of said pulleys having relatively separable halves with approximately conical belt-engaging surfaces for adjustably varying the length of path of belt travel between and around said pulleys.

FRANK J. HODER, Jr.

REFERENCES CITED

The following references are of record in the file of this patent:

UNITED STATES PATENTS

| Number | Name | Date |
|---|---|---|
| 1,149,040 | Foster et al. | Aug. 3, 1915 |
| 1,166,555 | Sprangers | Jan. 4, 1916 |
| 1,350,347 | Van Dolsen | Aug. 24, 1920 |
| 1,465,377 | Strain | Aug. 21, 1923 |
| 1,547,360 | Byrd | July 28, 1925 |
| 1,580,043 | Hoel | Apr. 6, 1926 |
| 1,634,529 | Allison | July 5, 1927 |